United States Patent [19]

Durkee

[11] E Re. 28,764

[45] Reissued Apr. 13, 1976

[54] ADJUSTABLE RAKE

[76] Inventor: Gale H. Durkee, 4301 Stafford, S.W., Wyoming, Mich. 49509

[22] Filed: Oct. 12, 1973

[21] Appl. No.: 405,742

Related U.S. Patent Documents

Reissue of:

[64] Patent No.: 3,701,243
Issued: Oct. 31, 1972
Appl. No.: 165,483
Filed: July 26, 1971

[52] U.S. Cl. ..... 56/400.15; 56/DIG. 18
[51] Int. Cl.[2] ..... A01D 7/00
[58] Field of Search ..... 56/400.18, 400.19; 403/109, 104, 106, 290

[56] References Cited

UNITED STATES PATENTS

| | | | |
|---|---|---|---|
| 2,279,324 | 4/1942 | Julien | 403/290 |
| 2,620,025 | 12/1952 | Powers | 287/58 CT X |
| 2,647,001 | 7/1953 | Andersson | 403/290 |
| 2,717,162 | 9/1955 | Walters | 287/58 CT X |
| 2,821,834 | 2/1958 | Walker | 56/400.19 |
| 2,841,948 | 7/1958 | Zenowitz | 56/400.18 |
| 3,258,903 | 7/1966 | Rienacker et al. | 56/400.18 |
| 3,334,901 | 8/1967 | Steffes | 273/68 |
| 3,368,271 | 2/1968 | Scheffler | 273/68 |

*Primary Examiner*—Russell R. Kinsey
*Attorney, Agent, or Firm*—McGarry & Waters

[57] ABSTRACT

A hand rake having a plurality of tines whose spread is adjustable in width for different operations. The tines extend through a guide at the bottom of the rake handle and are secured at their upper end to a retainer which slides along the handle. A special retainer structure clamps the upper end of the tines tightly so that the rotational position of the retainer is maintained by the tines in a fixed position with respect to the guide position. A split collar and locking nut arrangement facilitate the locking of the retainer with one hand in various adjusted positions along the handle. The handle can be made in two parts for separation when not in use. A hook extends from the guide for hanging the rake when not in use.

13 Claims, 6 Drawing Figures

FIG. 1
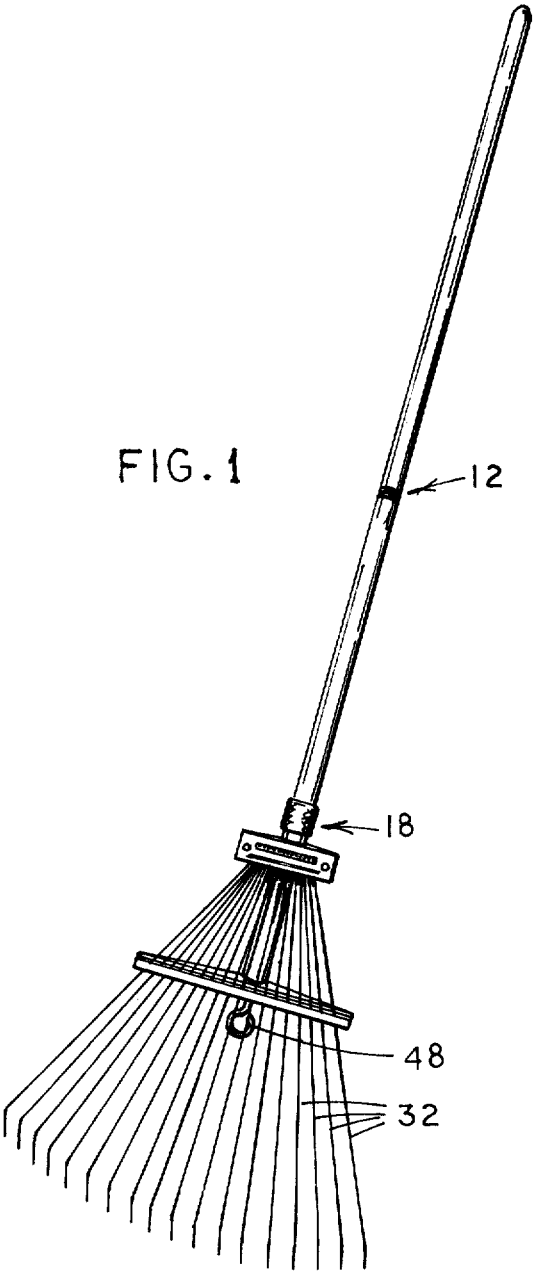
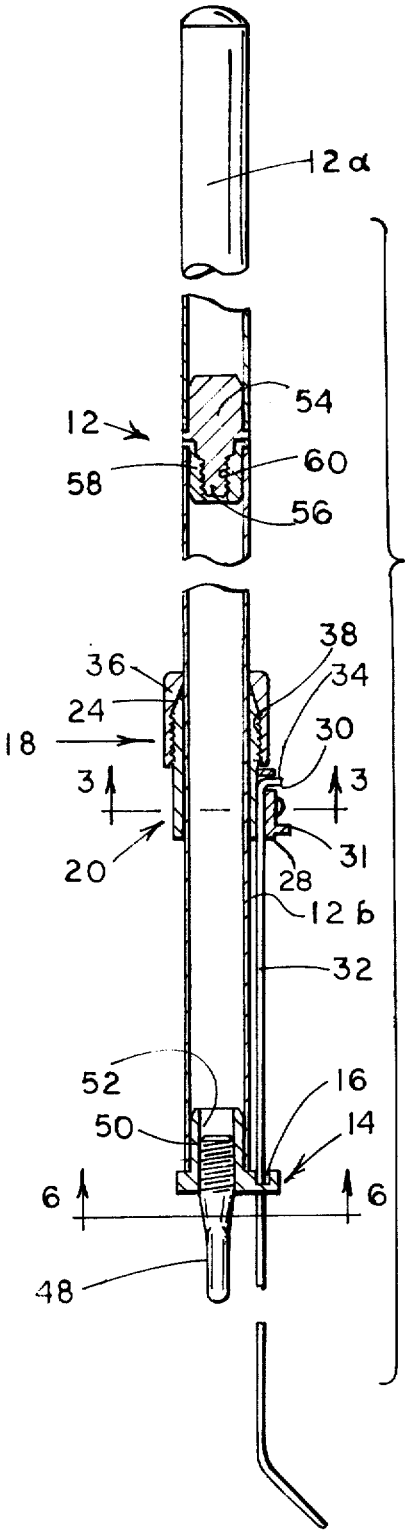
FIG. 2
INVENTOR.
BY GALE H. DURKEE
John T. McNamara
HIS ATTORNEY

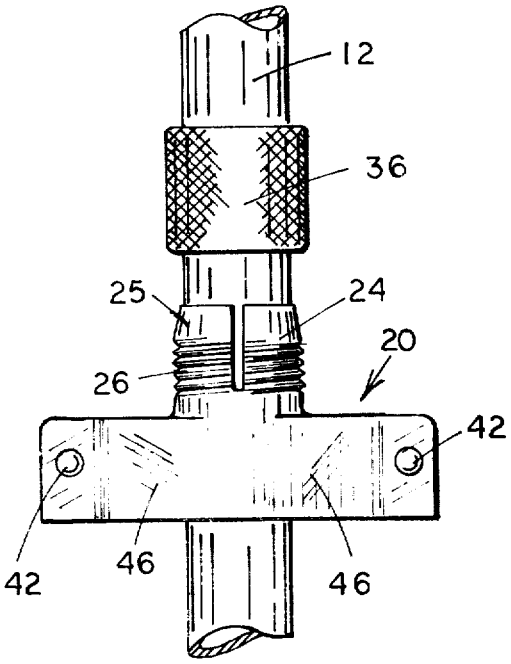
FIG. 5
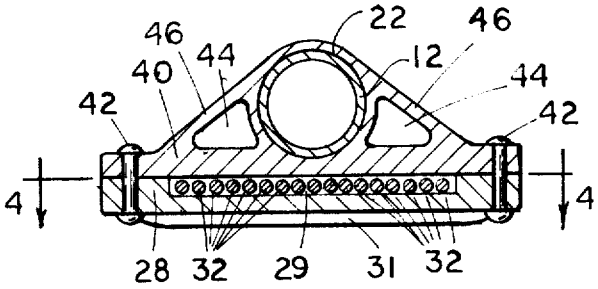
FIG. 3
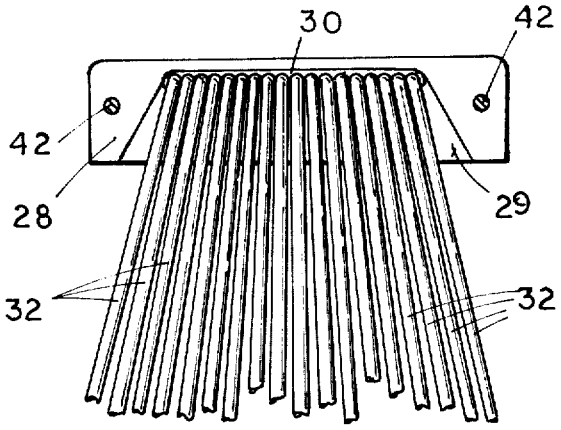
FIG. 4
FIG. 6
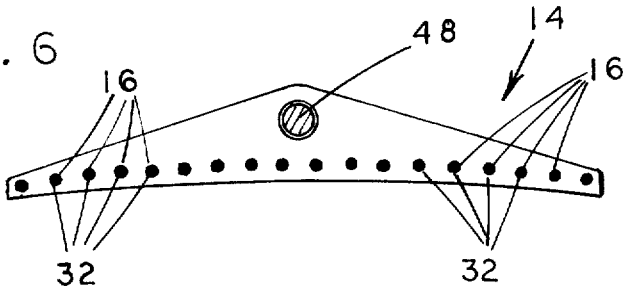
INVENTOR.
GALE H. DURKEE
BY John E McGarry
ATTORNEY

ADJUSTABLE RAKE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to hand rakes in which the spread of the tines and working length of the tines are adjustable.

2. State of the Prior Art

Rakes having tines which are adjustable for different operations are well known. For example, Tanaka in U.S. Pat. No. 1,663,395 discloses an adjustable rake in which tines are spaced apart at their upper ends and retained in a bracket which is secured to the rake handle by a clamp having a wing nut. Pairs of tines are joined together at their upper end through a downturned anchor. The spacing of the tines at the upper end limits the adjustability of the tine spread at the bottom portion of the rake.

Another adjustable rake is disclosed by Rienacker et al. in U.S. Pat. number 3,258,903. The Rienacker rake has the upper ends of tines in contact with each other and freely hinged into a carrier. In this arrangement, special provisions must be made to maintain the carrier in fixed angular positions with respect to the guide at the bottom of the handle. A cumbersome locking mechanism such as a thumbscrew loosens the carrier on the handle when adjusting the tines and the alignment relationship may not be maintained upon tightening the locking mechanism.

Still another adjustable rake is disclosed by Henne in U.S. Pat. No. 3,394,536. The Henne rake has a slidable tine retainer comprising a pair of identical brackets with a slot at the bottom portion to engage outwardly formed tine ends. A ring secures the retainer to the handle. The tines are held loosely by the bracket and with use the bracket spread can result in the tines falling out of the retainer during adjustment of the tines. Further, the retainer can rotate on the handle with respect to the guide at the bottom of the handle in the absence of special handle indentations. Again, the adjustment of the rake is rather cumbersome.

SUMMARY OF THE INVENTION

I have now discovered an improved adjustable rake of simplified construction, yet of improved operability. The tines are rigidly retained at the upper portions thereof to maintain a fixed relationship between the retainer and the tine guide without special handle indentations. Yet the tine upper ends are in contact with each other for wide adjustability of the spread of the tines at the lower end. Further, an improved locking arrangement permits adjustment of the tine position with one hand in a faster, simplified manner.

According to the invention, a guide member is secured to one end of a handle and has a plurality of laterally spaced apart holes. A tine retainer is slidably mounted on the handle and includes a cage and a support plate. The cage has a bore through which the handle extends. A split collar and a locking nut arrangement is provided on the cage for locking the retainer at selected adjusted positions along the handle.

A support plate has a transverse slot and an indentation for receiving the upper end portions of the tines. The very ends of the tines are bent outwardly and are secured in the slot. The tines are retained in the indentation of the support plate against a bottom portion of the cage in sufficiently rigid position to maintain a fixed angular relationship between the tine retainer and the guide. The support plate and the cage are clamped together between the slot and the lower end of the support plate to maintain the rigid relationship between the tines and the tine retainer.

BRIEF DESCRIPTION OF THE DRAWINGS

The invention will now be described with reference to the accompanying drawings in which:

FIG. 1 is a perspective view of a rake according to the invention;

FIG. 2 is a side-elevational view in section of the rake illustrated in FIG. 1;

FIG. 3 is a sectional view taken along line 3—3 of FIG. 1;

FIG. 4 is a partial sectional view taken along lines 4—4 of FIG. 3;

FIG. 5 is a partial top or plan view of the rake; and

FIG. 6 is a view taken along lines 6—6 of FIG. 2.

DETAILED DESCRIPTION OF THE PREFERRED EMBODIMENT

Referring now to the drawings, there is illustrated a rake having a handle 12 formed of a hollow elongated conduit. The handle 12 has a guide 14 secured at one end thereof. The guide 14 has a plurality of holes 16 therein for slidably receiving a plurality of tines 32. A tine retainer 18 is slidably mounted on the handle 12 and securely retains the ends of the tines *or prongs* 32. The retainer 18 is formed from a cage 20, a support plate 28, and a lock nut 36. The cage 20 is triangularly shaped in cross section and has a circular bore 22 extending therethrough for reception of the handle 12. The bore 22 extends through a *tubular shaped* split collar 24 having *tapered* wedging surfaces 25 and a threaded portion 26. *The split collar 24 forms opposed, resilient means, which substantially surround the handle 12. The wedging surfaces 25 form cam like pressure receiving surfaces for the lock nut 25.* The cage 20 has a wide transverse base portion 40 and downwardly extending strengthening ribs 46. A pair of holes 44 extend through the cage on either side of the bore 22 between the base portion 40 and the strengthening ribs 46. The ribs 46 strengthen and rigidify the base portion 40 for firm clamping action of tines 32.

The support plate 28 is a rectangularly shaped plate having a transverse slot 30 and an indentation 29 in the upper surface thereof extending outwardly from the slot 30 to the bottom edge of the support plate 28. A strengthening rib 31 extends laterally across the bottom of the support plate 28 to prevent bowing.

The tines 32 have bent ends 34 which extend into the slot 30 and are retained thereby. The upper portions of the tines 32 adjacent the bent ends 34 are positioned within the slot 30 and are retained therein against the transverse base portion 40 of the cage 20.

Rivets 42 extend through the side edges of the cage 20 and the support plate 28 to secure these two parts together in clamping relationship to the tines 32 in the slot 30. The rivets are positioned outwardly of the tines and between the slot 30 and the bottom edge of the support plate 28 to prevent loosening of the clamping relationship between the plate 28 and the base portion 40. The position of the rivets thus maintain the tines securely within the indentation 29.

The lock nut 36 is internally threaded at 38 and has wedging *or pressure applying* surfaces to mate with the surfaces 25 of the cage. The lock nut threads engage the threaded portion 26 of the cage and serves to wedge *the opposing sides of* the split collar 24 *simultaneously* into contact with the handle when tightened onto the cage 20.

The guide 14 is triangularly shaped as seen in the end view of FIG. 6 and has a tubular portion 50 extending rearwardly into the end of the tubular handle 12. A bore 52 extends through the tubular projection 50 and is threaded to receive the upper end of a hook or eye bolt 48. The upper end of the hook 48 is threaded to screw into the bore 52.

The handle 12 can be formed in two parts, 12a and 12b, as illustrated in FIG. 2. means are provided for removably fastening these two parts together. For this purpose, a first plug 52 is press-fit into the lower end of the upper handle portion 12a. The first plug 54 has a threaded projection 54 which extends from the bottom of the upper handle portion 12a. The lower handle portion 12b has at its upper end a second plug 58 which is press-fit therein. This plug 58 has a threaded core 60 which threadably receives the threaded projection 56 of the first plug 54. By this means, the handle can be easily separated into two parts for ease of storage and transportation.

In operation, the lock nut 36 threadably enages the split collar 24 of the cage 20 to secure the cage on the handle 12 in selected adjusted positions. Loosening the lock nut 36 permits the cage 20 to freely slide along the handle 12. *Thus, the lock nut 36 forces the free end of the split collar 24 resiliently into engagement with the handle 12 as the lock nut is tightened and releases the free end of the split collar as the lock nut is loosened to permit the free end to move resiliently away from the handle 12.* As the cage 20 and retainer 18 slide up along the handle 12, the tines will be pulled along therewith to shorten the length of the tines beneath the guide 14 and to narrow the width of the rake at the base for specialized raking operations. *As the lower ends of the tines 32 are drawn closer together, the uppers ends will pivot about the bent ends 34 in the slot 30 of the plate 28.*

The retainer 18 can be moved upwardly until the bottom ends of the tine reach the guide 14. At this point, the rake may be easily hung by the hook 48.

The rigid structure of the cage 20 and support plate maintain the tines in a rigid planar relationship within the retainer 18 but permit movement within the indentation 29 during adjustment of the spread of the tines. This rigid lanar relationship maintains the retainer in a fixed angular relationshsip with respect to the guide 14 to keep the tines aligned at the bottom ends. This structure therefore eliminates the need for special grooves and the like in the handle to achieve this result.

Desirably, the cage 20, locknut 36, support plate 28 and guide 14 are integrally molded of a rigid plastic material. Such parts can be inexpensively made by injection molding methods. Still further, certain plastic materials such as nylon and polyethylene have self-lubricating qualities which make the sliding action of the retainer easier.

Reasonable variation and modification are possible within the scope of the foregoing disclosure, the drawings, and appended claims without departing from the spirit of the invention.

The embodiments of the invention in which an exclusive property or privilege is claimed are defined as follows:

1. An adjustable hand rake comprising:

a handle having a longitudinal extent;

a guide member secured to one end of said handle, said guide member having a plurality of laterally spaced apart holes;

a tine retainer slidably mounted on said handle, said retainer including a transversely extending one piece cage and a one piece transversely extending support plate, said cage having an axial bore through which said handle extends;

said support plate having a transversely extending slot and a transversely extending indentation angularly extending from said transversely extending slot to a bottom edge of said support plate;

a plurality of tines extending through said guide member holes, the upper ends of said tines being bent outwardly, the upper portion of said tines being positioned in said indentation with said upper bent ends extending into said transversely extending slot;

said cage having a transversely extending wide base flange covering said tines upper portion;

said support plate and said cage wide base flange having transversely extending portions extending longitudinally of said slot and parallel to said tines in clamping engagement therewith longitudinally of said outwardly bent portions; and means rigidly clamping said support plate to said cage wide base flange for rigidly retaining said tines in said indentation for movement laterally within said indentation but otherwise preventing said tines from movement in said indentation, said rigidly clamped tines maintaining said tine retainer in a fixed angular position on said handle with respect to said guide member.

2. An adjustable hand rake according to claim 1 wherein said indentation flares outwardly from said slot.

3. An adjustable rake according to claim 1 wherein said clamping means extends through said cage base flange and said support plate at points spaced outwardly of said tines and between said slot and said lower end of said support plate.

4. An adjustable hand rake according to claim 3 wherein said tine ends are in contact with each other in said longitudinal slot.

5. An adjustable hand rake according to claim 1 wherein said tine ends are in contact with each other in said longitudinal slot.

6. An adjustable hand rake according to claim 1 wherein said tine retainer includes a split collar on said cage and surrounding said handle, a lock nut surrounding at least a portion of said split collar, means for tightening said lock nut on said split collar, and means for wedging said split collar against said handle as said lock nut is tightened on said split collar, whereby said tine retainer can be locked in selected adjusted positions along said handle.

7. An adjustable hand rake according to claim 1 wherein said handle is tubular with a hollow interior, said guide member has a tubular projection extending into said one end of said handle and secured thereby to said handle.

8. An adjustable hand rake according to claim 7 and further comprising a hook having one end portion secured within said tubular projection and another end extending downwardly thereof whereby said rake can be hung from said hook when not in use.

9. An adjustable hand rake according to claim 1 and further comprising a hook secured to said guide member whereby said rake can be hung from said hook when not in use.

10. An adjustable hand rake according to claim 1 wherein said handle is divided into first and second sections and further comprising means for removably securing said handle sections together.

11. An adjustable rake according to claim 10 wherein said handle is tubular with a hollow interior, and said securing means includes a first plug in one end of said first section of said handle, said first plug having a threaded bore, a second plug in an end of said second section of said handle, said second plug having a threaded projection adapted to engage said threaded bore of said first plug.

*12. In an adjustable rake having an elongated handle, a transverse prong guide secured to the handle, a prong carrier slidably received on the handle, and a plurality of elongated prongs pivotally secured to the prong carrier and slidably received in said prong guide, an improved*

*means for selectively securing the prong carrier to the handle at any of a plurality of selected positions along the length thereof including opposed resilient means on said carrier and substantially surrounding said handle, the resiliency of each of said opposed means tending to move each away from said handle, each of said opposed means including a cam-like pressure receiving surface, and means for selectively and simultaneously applying pressure to said surfaces to force said opposed means into tight frictional engagement with said handle to secure said prong carrier thereto in a desired position thereon.*

*13. In an adjustable rake having an elongated handle, a transverse prong guide secured to the handle, a prong carrier slidably received on the handle, and a plurality of elongated prongs pivotally secured to the prong carrier and slidably received in said prong guide, an improved means for selectively securing the prong carrier to the handle at any of a plurality of selected positions along the length thereof including opposed means on said carrier and substantially surrounding said handle, each of said opposed means tending to move each away from said handle, each of said opposed means including a cam-like pressure receiving surface, and means for selectively and simultaneously applying pressure to said surfaces to force said opposed means into tight frictional engagement with said handle to secure said prong carrier thereto in a desired position thereon.*

* * * * *